Oct. 23, 1934.      C. STEENSTRUP      1,978,176
APPARATUS AND METHOD FOR MAKING ICE CREAM
Filed June 12, 1928
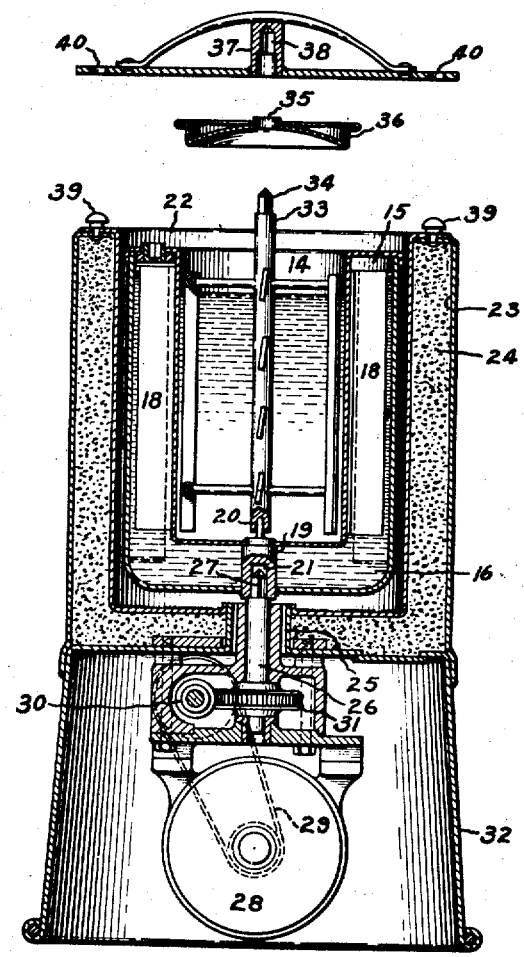
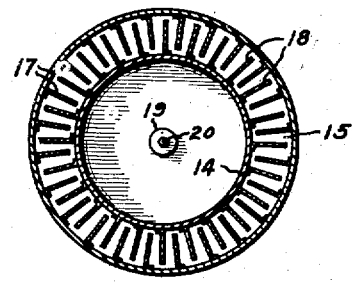
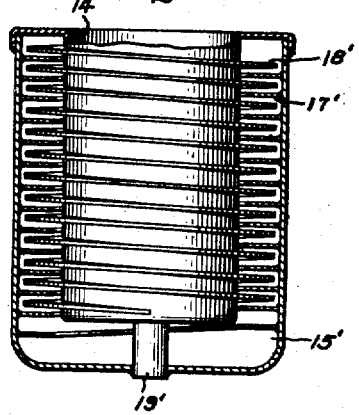
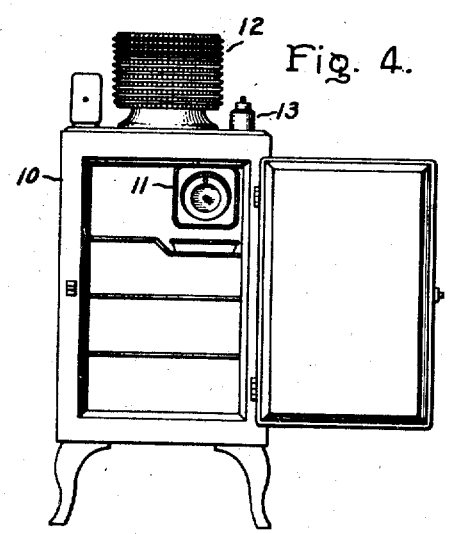
Inventor
Christian Steenstrup,
by Charles E. Tullar
His Attorney.

Patented Oct. 23, 1934

1,978,176

UNITED STATES PATENT OFFICE 1,978,176

APPARATUS AND METHOD FOR MAKING ICE CREAM

Christian Steenstrup, Schenectady, N. Y., assignor to General Electric Company, a corporation of New York Application June 12, 1928, Serial No. 284,743

10 Claims. (Cl. 62—114)

My invention relates to an apparatus and method for making ice cream or the like by the use of a refrigerator having a refrigerating system associated therewith.

Household refrigerators of this kind have not generally provided, heretofore, any arrangement for making ice cream or the like requiring stirring during freezing the same, because the systems have not had sufficient refrigerating capacity to lower the temperature of the mixture for making ice cream to that desired for freezing and, at the same time, absorb the heat evolved in stirring. Moreover, arrangements that have been proposed for the purpose required considerable modification of the refrigerators and cannot for this reason be applied to refrigerators that are already in use. In some instances it may have been possible to make ice cream by the use of the system of a refrigerator of this kind, but experience has shown that the ice cream could not be properly frozen, and if it was frozen at all, the time required is several hours, which is unreasonably long. For this reason, it has been, heretofore, entirely impracticable to make ice cream in such a refrigerator.

The object of my invention is to provide an apparatus and method for making ice cream or the like by utilizing the refrigerating system of a refrigerator, such as used for household purposes, without modification of its usual construction. I accomplish this by providing an apparatus, which is adapted to be used in connection with the ordinary refrigerator having a refrigerating system associated therewith, comprising a negative heat storage device including a receptacle having a sealed chamber surrounding the same containing any suitable freezing solution. The quantity of freezing solution is such that when it is frozen in the refrigerator to form a mushy ice the negative heat storage capacity thereof will be great enough to lower the temperature of the mixture for making ice cream or the like to the desired freezing temperature, and also absorb the heat evolved in stirring the mixture. The particular method which I employ in making ice cream by the use of this apparatus, comprises cooling the solution in a chamber arranged in the freezing compartment of the refrigerator, removing the chamber from the refrigerator, placing the mixture for making ice cream in heat exchange relation with the cooled solution so as to utilize the refrigerating effect of the same for freezing the mixture, and stirring the mixture during freezing the same.

My invention will be more fully set forth in the following description referring to the accompanying drawing, and the features of novelty which characterize my invention will be pointed out with particularity in the claims annexed to and forming a part of this specification.

In the drawing, Fig. 1 is a vertical sectional view of the receptacle which I employ in making ice cream and of the stirring device which is used during freezing operation; Fig. 2 is a transverse section of the receptacle shown in Fig. 1; Fig. 3 is a vertical sectional view of a modified form of receptacle which I may employ, and Fig. 4 is a front elevation of a refrigerator showing a receptacle used for making ice cream arranged in the cooling unit of the refrigerator.

Referring to the drawing, the apparatus which I have shown for making ice cream or the like can be used in connection with any of the well known forms of refrigerators having a refrigerating system associated therewith. The particular refrigerator which I have shown, for convenience in illustration (Fig. 4), comprises a cabinet 10 having a cooling unit 11 therein to which refrigerant is supplied from an air-cooled condenser 12 under control of a float valve 13, and from which the refrigerant is returned to the compressor of the system. Such a system is shown for example in my application, Serial No. 166,212, filed Feb. 5, 1927, Patent No. 1,736,635 and assigned to the assignee of the present application. The details of construction of the cooling unit 11 are shown in my application, Serial No. 148,266, filed Nov. 13, 1926, Patent No. 1,755,084, which is also assigned to the assignee of the present application.

In a refrigerator of this kind the refrigerating capacity of the system employed therewith can be used for making ice cubes or certain frozen desserts that do not require stirring. However, the refrigerating capacity of the system is so small that it cannot be used for making ice cream or the like requiring stirring, because the refrigerating capacity required to absorb the heat evolved in stirring and to lower the temperature of the amount of ice cream ordinarily desired, say one or two quarts, to the proper freezing temperature is greater than the refrigerating capacity of the system.

In accordance with my invention, I provide a negative heat storage device having sufficient capacity to absorb the heat required to lower the temperature of the mixture for making ice cream to the desired freezing temperature and also absorb the heat evolved in stirring the mixture during freezing the same. In the use of this device it is first cooled in a refrigerator several hours before the ice cream is made, removed from the refrigerator, and then arranged in heat exchange relation with the mixture for making ice cream, a suitable stirring device being provided for stirring the mixture during freezing of the same. The particular form of negative heat storage device which I have shown in this instance comprises a receptacle 14 for containing the mixture for making ice cream having a sealed chamber 15 surrounding the same containing a suitable freezing solution 16 of sufficient quantity to provide the necessary negative heat storage capacity upon being cooled to the temperature to which it can be lowered in the cooling unit of the refrigerator. The freezing solution may be of any suitable substances, but I have found that the proportions by weight of a solution of glycerin 20 and water 80, or potassium carbonate 18 and water 100, is satisfactory.

When the negative heat storage device is arranged in the cooling unit 11 to the refrigerator preparatory to making ice cream, it is desirable to cool the freezing solution 16 as rapidly as possible. I have, therefore, provided means in the chamber 15 extending from the outer wall thereof toward the wall of the receptacle 14, but in spaced relation thereto which will transmit heat from the solution to the outer wall of the chamber 15 adjacent the walls of the cooling unit. In the particular form of the receptacle shown in Figs. 1 and 2, this means comprises a plurality of longitudinally extending fins 17 attached to the outer wall of the chamber and extending in spaced relation to the wall of the receptacle.

After the negative heat storage device containing the freezing solution in the chamber 15 is cooled in the cooling unit of the refrigerator and removed therefrom for making ice cream, it is also desirable that the heat transferred from the mixture for making ice cream in the receptacle 14, and the heat evolved in stirring the same, should be quickly transmitted to the freezing solution 16. For this purpose I arrange means in the chamber 15 extending from the wall of the receptacle 14 in spaced relation to the outer wall of the chamber for conducting heat from the receptacle to the solution in the chamber. This means comprises a plurality of fins 18 extending longitudinally of the receptacle 14 on the outer wall thereof and into the chamber 15. The fins 18 extend between the fins 17 and in spaced relation to the wall of the chamber 15. The negative heat storage device is provided with means for supporting a dasher in the receptacle during the freezing operation which comprises a member 19 welded in openings in the bottom of the receptacle 14 and the chamber 15 having a support 20 for the dasher and also a socket 21 therein to form a driving connection with the stirring device.

It is to be understood, however, that in the construction of the negative heat storage device the arrangement of the heat conducting means may be varied as desired. A modification is shown, for example, in Fig. 3 comprising a receptacle 14' having a chamber 15' surrounding the same provided with a helical fin 18' extending from the wall of the receptacle into the chamber 15' in spaced relation to the outer wall thereof for conducting heat from the receptacle to the freezing solution therein. A helical fin 17', extending from the outer wall of the chamber in spaced relation to the wall of the receptacle 14' is also provided for conducting heat from the receptacle to the freezing solution. This negative heat storage device is provided with a member 19' which is welded in openings in the bottom of receptacle 14' and the outer wall of the chamber 15' respectively, having a support for a dasher in the receptacle 14' and also a socket adapted to form a driving connection with the stirring device, as in the structure shown in Figs. 1 and 2.

I prefer to rotate the receptacle for the mixture for making ice cream and its surrounding chamber during the freezing operation and also stir the mixture in the receptacle. This may be done in any convenient manner, but the construction which I have shown for the purpose comprises a driving mechanism which is secured in any opening in the bottom of a cylindrical container 22 having a closed chamber 23 surrounding the same which is filled with heat insulation 24 to prevent the transfer of heat from the surrounding air to the negative heat storage device during the freezing operation. The driving mechanism, which is supported in an opening 25 in the bottom of the container, comprises a shaft 26 having a squared end 27 adapted to support the negative heat storage device and rotate the same by engaging the socket 21 in a member 19 secured to the bottom thereof. The shaft is driven by an electric motor 28 which is secured to the bottom of the cylindrical container 22 and connected to the shaft 26 by a belt 29, worm 30 and the wheel 31 secured to the shaft. This driving mechanism is arranged in a hollow cylindrical base member 32 which is secured to the bottom of the container 22. In order to stir the mixture in the receptacle 14, a dasher 33 is supported in the bottom thereof at 19 and the squared end 34 thereof extends through an opening 35 in a flanged cover 36 which slidably fits the mouth of the receptacle 14. The dasher is held stationary by a bracket 37 having a socket 38, which engages the squared end 34 of the dasher, and which is adapted to be connected to the container 22 by headed bolts 39 engaging openings 40 in the bracket. It will thus be seen that the dasher will stir the mixture in the receptacle 14 during the freezing operation, as the dasher 33 is held stationary by the bracket 37 and the negative heat storage device including the receptacle 14 is rotated by the motor.

In making ice cream or the like by use of the apparatus which I have described a novel method is involved. In order to carry out this method I first arrange the negative heat storage device in the cooling unit of the refrigerator for several hours prior to the time when it is desired to make ice cream which cools the freezing solution so as to form a mushy ice. I then remove the device from the refrigerator, place a mixture for making ice cream or the like in heat exchange relation with the solution so as to utilize the refrigerating effect of the same for freezing the mixture, and then stir the mixture during the freezing operation. In doing this by the use of the construction which I have shown the following steps are carried out: First, I sufficiently cool the negative heat storage device in the cooling unit 11 of the refrigerator to give the required negative heat storage capacity to freeze the mixture for making ice cream and also absorb the heat evolved in stirring the same. I remove the device from the refrigerator and arrange the same in the heat insulated container 22 so as to form a driving connection with the shaft 25 which is driven by the motor 28. I then place the mixture for making the ice cream or the like in the receptacle 14, and after arranging the dasher 33, the cover 36 and the bracket 37 in place, I rotate the negative storage device and stir the mixture by operating the motor 28. In this way I freeze the ice cream in ten minutes or so although the refrigerating capacity of the system is too small for the purpose.

In view of the foregoing it will be apparent that I have provided an improved apparatus and method for making ice cream in a household refrigerator of any well known form in a comparatively short time, and I accomplish this without any change in the construction of the refrigerator.

Modifications of the construction and variations in the method which I have described will occur to those skilled in the art, so that I do not desire to be limited to the particular apparatus or method set forth except as defined in the appended claims.

What I claim as new and desire to secure by Letters Patent of the United States is:

1. A receptacle for making ice cream or the like, an outer wall forming a sealed chamber surrounding said receptacle and containing a freezing solution, means extending from the wall of said receptacle into said chamber in spaced relation to the outer wall for conducting heat from the receptacle to the freezing solution, and another means extending from the outer wall of said chamber into the same in spaced relation to the wall of said receptacle for conducting heat from the solution in said chamber to cool the same.

2. A receptacle for making ice cream or the like, an outer wall forming a sealed chamber surrounding said receptacle containing a freezing solution, a fin arranged in said chamber and extending from the wall of said receptacle in spaced relation to the outer wall for conducting heat from said receptacle to the solution in said chamber, and another fin arranged in said chamber and extending from the outer wall thereof in spaced relation to the wall of said receptacle for conducting heat from the solution in said chamber to the outer wall thereof.

3. A receptacle for making ice cream or the like, an outer wall forming a closed chamber surrounding said receptacle and containing a freezing solution, a plurality of fins extending radially from said receptacle in spaced relation to the outer wall for conducting heat from said receptacle to the solution in said chamber, and a plurality of other fins extending radially inward from the outer wall of said chamber between said first mentioned fins and in spaced relation to the wall of said receptacle for conducting heat from the solution in said chamber to the outer wall thereof.

4. A method of making ice cream or the like by the use of a refrigerator having a refrigerating system associated therewith including a freezing compartment in the refrigerator comprising, cooling a solution in a chamber arranged in the freezing compartment, removing the chamber from the refrigerator, placing the mixture for making ice cream or the like in heat exchange relation with the cooled solution so as to utilize the refrigerating effect of the same for freezing the mixture, and agitating the mixture during freezing of the same.

5. A method of making ice cream or the like by the use of a refrigerator having a refrigerating system associated therewith including a cooling unit in the refrigerator comprising, cooling a negative heat storage device, having a receptacle and a sealed chamber surrounding the same containing a freezing solution, in the cooling unit of the refrigerator, removing the heat storage device from the freezing compartment, placing a mixture for making ice cream or the like in the receptacle in heat exchange relation with the wall thereof so as to utilize the refrigerating effect of the cooled solution for freezing the same, and stirring the mixture during freezing of the same.

6. A method of making ice cream or the like by the use of a refrigerating system associated therewith including a cooling unit in the refrigerator, and a negative heat storage device including a receptacle having a sealed chamber surrounding the same containing a freezing solution and heat conducting means extending into the chamber from the wall of the receptacle and the outer wall of the chamber respectively comprising, cooling the negative heat storage device in the cooling unit of the refrigerator, removing the negative heat storage device from the refrigerator, placing a mixture for making ice cream or the like in the receptacle in contact with the wall thereof so as to utilize the refrigerating effect of the cooled solution for freezing the same, and stirring the mixture during freezing of the same.

7. A freezing device of the character described comprising a container, a receptacle entirely enclosing said container, except at the top thereof, the sides of the receptacle being connected to the sides of the container at the top ends thereof and providing a liquid tight chamber about the sides and bottom of the container, said chamber having a low point freezing liquid thereon, a series of heat conducting fins extending between the sides of the container and the sides of the receptacle within said chamber, and a refrigerating tank having a recess therein opening to one side thereof and into which said receptacle is adapted to be loosely fitted to reduce the temperature of the liquid in the receptacle to the temperature required to freeze the contents of the container.

8. A freezing device of the character described comprising a container having a closure at its top and a stirring device therefor, a receptacle within which said container is supported, the sides of said receptacle being connected to the sides of the container adjacent the closure thereof, to provide a liquid tight chamber about the container, said chamber having a liquid therein, the freezing point of which approximately corresponds to the freezing temperature required in the container, and a refrigerating device having a recess adapted to receive said receptacle and to reduce the temperature of the liquid in said chamber to the desired point.

9. A freezing device of the character described comprising a container having a stirring device and a closure for the top end thereof, a receptacle entirely enclosing said container, except at the top thereof, the sides of the receptacle being connected to the sides of the container at the top ends thereof and providing a liquid tight chamber about the sides and bottom of the container, said chamber having a low point freezing liquid therein and a refrigerating device having a recess adapted to receive said receptacle and reduce the temperature of the liquid therein to the temperature required to freeze the contents of the container.

10. A freezing device of the character described comprising a container having a stirring device and a closure for the top end thereof, a receptacle entirely enclosing said container, except at the top thereof, the sides of the receptacle being connected to the sides of the container at the top ends thereof and providing a liquid tight chamber about the sides and bottom of the container, said chamber having a low point freezing liquid thereon, a series of heat conducting fins extending between the sides of the container and the sides of the receptacle within said chamber, and a refrigerating tank having a recess therein opening to one side thereof and into which said receptacle is adapted to be loosely fitted to reduce the temperature of the liquid in the receptacle to the temperature required to freeze the contents of the container.

CHRISTIAN STEENSTRUP.

CERTIFICATE OF CORRECTION.

Patent No. 1,978,176.            October 23, 1934.

CHRISTIAN STEENSTRUP.

It is hereby certified that error appears in the printed specification of the above numbered patent requiring correction as follows: Page 2, line 91, for "any" read an; and page 3, line 36, claim 2, befor the word "containing" insert the word and; and that the said Letters Patent should be read with these corrections therein that the same may conform to the record of the case in the Patent Office.

Signed and sealed this 5th day of February, A. D. 1935.

(Seal)

Leslie Frazer
Acting Commissioner of Patents.

top thereof, the sides of the receptacle being connected to the sides of the container at the top ends thereof and providing a liquid tight chamber about the sides and bottom of the container, said chamber having a low point freezing liquid thereon, a series of heat conducting fins extending between the sides of the container and the sides of the receptacle within said chamber, and a refrigerating tank having a recess therein opening to one side thereof and into which said receptacle is adapted to be loosely fitted to reduce the temperature of the liquid in the receptacle to the temperature required to freeze the contents of the container.

CHRISTIAN STEENSTRUP.

CERTIFICATE OF CORRECTION.

Patent No. 1,978,176.　　　　　　　　　　　　　October 23, 1934.

CHRISTIAN STEENSTRUP.

It is hereby certified that error appears in the printed specification of the above numbered patent requiring correction as follows: Page 2, line 91, for "any" read an; and page 3, line 36, claim 2, befor the word "containing" insert the word and; and that the said Letters Patent should be read with these corrections therein that the same may conform to the record of the case in the Patent Office.

Signed and sealed this 5th day of February, A. D. 1935.

Leslie Frazer (Seal)　　　　　　　　　　　　　　　　Acting Commissioner of Patents.